(12) United States Patent
Inoue (10) Patent No.: US 8,190,154 B2
(45) Date of Patent: May 29, 2012

(54) COMMUNICATION SYSTEM FOR PROCESSING OF RECEPTION INFORMATION USING SUBSCRIBER INFORMATION

(75) Inventor: Takahiro Inoue, Sapporo (JP)

(73) Assignee: NTT DoCoMo, Inc., Tokyo (JP)

( * ) Notice: Subject to any disclaimer, the term of this patent is extended or adjusted under 35 U.S.C. 154(b) by 964 days.

(21) Appl. No.: 12/176,018

(22) Filed: Jul. 18, 2008

(65) Prior Publication Data

US 2009/0023444 A1    Jan. 22, 2009

(30) Foreign Application Priority Data

Jul. 20, 2007   (JP) ................ P2007-189836

(51) Int. Cl.
   *H04W 4/00*    (2009.01)
   *H04M 3/42*    (2006.01)
(52) U.S. Cl. .................... 455/435.1; 455/415
(58) Field of Classification Search .......... 455/417, 455/432.3, 560, 558, 435.1–435.3, 410, 411, 455/466, 456.1–456.6; 370/335, 338
   See application file for complete search history.

(56) References Cited

U.S. PATENT DOCUMENTS

| | | | | |
|---|---|---|---|---|
| 2004/0229601 | A1* | 11/2004 | Zabawskyj et al. | ............. 455/417 |
| 2005/0075106 | A1* | 4/2005 | Jiang | ............. 455/432.3 |

FOREIGN PATENT DOCUMENTS

| | | |
|---|---|---|
| DE | 102 35 628 A1 | 2/2004 |
| EP | 0 966 142 A2 | 12/1999 |
| JP | 64-54861 | 3/1989 |
| JP | 9-186775 | 7/1997 |
| JP | 2002-057802 | 2/2002 |
| JP | 2005-005807 | 1/2005 |
| JP | 2006-33684 | 2/2006 |
| JP | 2006-121334 | 5/2006 |
| JP | 2007-020063 | 1/2007 |
| JP | 2007-053431 | 3/2007 |
| WO | WO 2005/017693 A2 | 2/2005 |
| WO | WO 2005/018209 A1 | 2/2005 |
| WO | WO 2007/017457 A1 | 2/2007 |
| WO | WO 2007/036405 A1 | 4/2007 |

OTHER PUBLICATIONS

Office Action issued Jul. 6, 2011, in European Patent Application No. 08 013 092.5.

Chinese Office Action issued on Apr. 25, 2011 in corresponding Chinese Application No. 200810135894.X (with an English Translation).

* cited by examiner

*Primary Examiner* — Michael Faragalla
(74) *Attorney, Agent, or Firm* — Oblon, Spivak, McClelland, Maier & Neustadt, L.L.P.

(57) ABSTRACT

A communication system includes: a subscriber information storage device configured to store subscriber information; a registration unit configured to register, in addition to first subscriber information, second subscriber information in the subscriber information storage device, as sub-registrant subscriber information of a first terminal unit, the first subscriber information being the subscriber information associated with a first terminal unit, and the second subscriber information being the subscriber information associated with a second terminal unit; and a reception processor configured to acquire the sub-registrant subscriber information associated with the first subscriber information by referring to the subscriber information storage device, when transmission is made to the first terminal unit, and subsequently to perform processing of reception at the second terminal unit with use of the sub-registrant subscriber information.

9 Claims, 10 Drawing Sheets

| MAIN-USER SUBSCRIBER INFORMATION | SUB-USER SUBSCRIBER INFORMATION | SUB-USER HOLDER SUBSCRIBER INFORMATION |
|---|---|---|
| SUBSCRIBER INFORMATION A | SUBSCRIBER INFORMATION B | — |
| | SUBSCRIBER INFORMATION C | |
| SUBSCRIBER INFORMATION B | SUBSCRIBER INFORMATION C | SUBSCRIBER INFORMATION A |
| SUBSCRIBER INFORMATION C | — | SUBSCRIBER INFORMATION A |
| | | SUBSCRIBER INFORMATION B |

| MAIN-USER SUBSCRIBER INFORMATION | SUB-USER SUBSCRIBER INFORMATION | RESTRICTION INFORMATION | SUB-USER HOLDER SUBSCRIBER INFORMATION | RESTRICTION INFORMATION |
|---|---|---|---|---|
| SUBSCRIBER INFORMATION A | SUBSCRIBER INFORMATION B | WITH RESTRICTION INFORMATION | — | — |
| | SUBSCRIBER INFORMATION C | WITHOUT RESTRICTION INFORMATION | | |
| SUBSCRIBER INFORMATION B | SUBSCRIBER INFORMATION C | WITHOUT RESTRICTION INFORMATION | SUBSCRIBER INFORMATION A | WITHOUT RESTRICTION INFORMATION |
| SUBSCRIBER INFORMATION C | — | | SUBSCRIBER INFORMATION A | WITH RESTRICTION INFORMATION |
| | | | SUBSCRIBER INFORMATION B | WITHOUT RESTRICTION INFORMATION |

COMMUNICATION SYSTEM FOR PROCESSING OF RECEPTION INFORMATION USING SUBSCRIBER INFORMATION

CROSS REFERENCE TO RELATED APPLICATIONS

This application is based upon and claims the benefit of priority from prior Japanese Patent Application No. 2007-189836, filed on Jul. 20, 2007; the entire contents of which are incorporated herein by reference.

BACKGROUND OF THE INVENTION

1. Field of the Invention

The present invention relates to a communication system including a subscriber information storage device for storing subscriber information.

2. Description of the Related Art

Conventionally, one telephone number has been commonly assigned to one terminal unit (e.g., mobile phone). In contrast, a service for assigning a plurality of telephone numbers (for example, at most 3 telephone numbers) to one terminal unit has been recently proposed. Further, a proposal for assigning one telephone number to a plurality of terminal units has also been recently proposed.

Further, a technique for using pieces of subscriber information selectively depending on the situations, with use of a USIM that stores a plurality of pieces of subscriber information (IMSI) (see claim 1, paragraphs 0041, 0054 and 0055 of Japanese Patent Application Publication No. 2006-121334). With this technique, a plurality of pieces of subscriber information of different contractor names can also be stored in the USIM. Accordingly, it is possible, for example, to use subscriber information in personal name and subscriber information in corporate name selectively depending on the situations.

However, in the conventional technique as described above, since the USIM is installed in the terminal unit, the subscriber information is switched at the terminal unit.

Here, let us assume a case where a certain terminal unit is provided with the USIM in which subscriber information A (in personal name) and subscriber information B (in corporate name) are stored, and another terminal unit (transmission terminal) performs transmission to the certain terminal unit (reception terminal).

In the case where both the subscriber information A and the subscriber information B are active, when the transmission terminal performs transmission with the subscriber information A, the reception terminal receives the transmission with the subscriber information A. In the same way, when the transmission terminal performs transmission with the subscriber information B, the reception terminal receives the transmission with the subscriber information B.

Meanwhile, in the case where only the subscriber information A is active, when the transmission terminal performs transmission with the subscriber information B, the reception terminal cannot receive the transmission. In the same way, in the case where only the subscriber information B is active, when the transmission terminal performs transmission with the subscriber information A, the reception terminal cannot receive the transmission.

Accordingly, in the conventional technique as described above, the subscriber information used in transmission needs to coincide with the subscriber information used in reception. As a result, the degree of freedom in selecting subscriber information used in transmission or reception is low, and thus convenience of a user is decreased.

BRIEF SUMMARY OF THE INVENTION

An aspect of the present invention is a communication system including a subscriber information storage device configured to store subscriber information. The communication system includes a registration unit (registration unit 31) and a reception processor (reception processor 33). The registration unit is configured to register, in addition to first subscriber information, second subscriber information in the subscriber information storage device, as sub registrant subscriber information of the first terminal unit. The first subscriber information is subscriber information associated with a first terminal unit. The second subscriber information is subscriber information associated with a second terminal unit. The reception processor is configured to acquire the sub-registrant subscriber information associated with the first subscriber information by referring to the subscriber information storage device, when transmission is made to the first terminal unit, and subsequently to perform processing of reception at the second terminal unit with use of the sub-registrant subscriber information.

According to the aspect, the second subscriber information, in addition to the first subscriber information, is registered as the sub-registrant subscriber information in the subscriber information storage device. When transmission is made to the first terminal unit, processing of reception at the second terminal unit is performed with use of the sub-registrant subscriber information.

As described above, the subscriber information used in transmission does not need to coincide with the subscriber information used in reception. As a result, compared with a conventional technique in which the subscriber information is switched at the terminal unit, degree of freedom in selecting subscriber information used in transmission or reception is enhanced, and thus convenience of a user is enhanced.

According to the aspect as described above, the registration unit registers, in addition to the second subscriber information, the first subscriber information in the subscriber information storage device, as sub-registrant holder subscriber information (Here, sub-registrant holder indicates the main user viewed from the sub-user side.) of the second terminal unit. The reception processor acquires the sub-registrant holder subscriber information associated with the second subscriber information by referring to the subscriber information storage device, when transmission is made to the second terminal unit, and subsequently perform processing of reception at the first terminal unit with use of the sub-registrant holder subscriber information.

According to the aspect as described above, the communication system further includes a transmission processor (transmission processor 34). The transmission processor is configured to acquire the sub-registrant subscriber information associated with the first subscriber information by referring to the subscriber information storage device when transmission is made from the first terminal unit, and subsequently perform processing of transmission from the second terminal unit with use of the sub-registrant subscriber information.

According to the aspect as described above, the transmission processor acquires the sub-registrant holder subscriber information associated with the second subscriber information by referring to the subscriber information storage device when transmission is made from the second terminal unit, and subsequently perform processing of transmission from the first terminal unit with use of the sub-registrant holder subscriber information.

According to the aspect as described above, the communication system further includes a transferer (transferer 38). The transferer is configured to transfer communication performed by one of the first terminal unit and the second terminal unit to the other terminal unit.

According to the aspect as described above, the communication system further includes a restrictor (restrictor 35). The restrictor is configured to restrict one of reception processing with use of the sub-registrant subscriber information and transmission processing with use of the sub-registrant subscriber information.

According to the aspect as described above, the communication system further includes a restrictor (restrictor 35). The restrictor is configured to restrict one of reception processing with use of the sub-registrant holder subscriber information and transmission processing with use of sub-registrant holder subscriber information.

According to the aspect as described above, in the case where one of the first terminal unit and the second terminal unit has responded, the reception processor discontinues processing of reception at the other terminal unit, and send to the other terminal unit the identification information of the terminal unit which has responded.

According to the aspect as described above, the communication system further includes a service provider (service provider 36). The service provider is configured to, in the case where an additional service to be used at reception is set to one of the first terminal unit and the second terminal unit, provide the additional service also to the other terminal unit.

According to the aspect as described above, the communication system further includes a notifier (notifier 37). In the case where transmission is made to one of the first terminal unit and the second terminal unit, the notifier is configured to notify identification information of the terminal unit to which transmission is made, to the other terminal unit which has responded to operation by the reception processor.

According to the aspect as described above, the communication system further includes a notifier (notifier 37). The notifier is configured to notify a communication status of the other terminal unit, to one of the first terminal unit and the second terminal unit.

DETAILED DESCRIPTION OF THE INVENTION

Hereinafter, a communication system according to embodiments of the present invention will be described with reference to the drawings. Note that same or similar numerals and characters are provided to same or similar portions.

Note that the drawings are only schematic and individual dimensional ratios and the like are different from those in reality. Therefore, specific dimensions should be determined with reference to the explanation to be described later. It goes without saying that dimensional relationships and ratios vary also among some of the different drawings.

[First Embodiment]
(Configuration of the Communication System)

Figure 1:
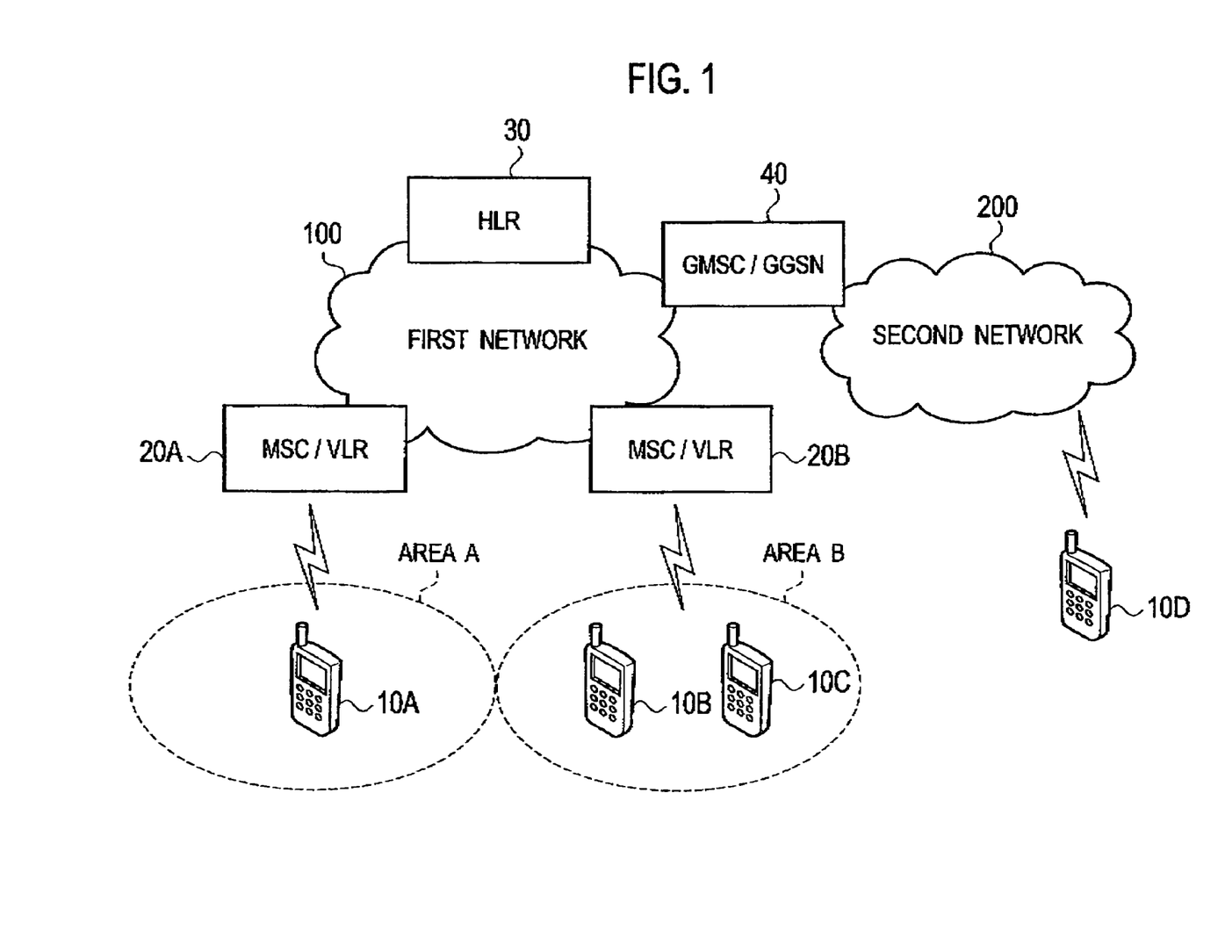
FIG. 1 is a diagram showing a configuration of a communication system according to a first embodiment.

Hereinafter, a configuration of a communication system according to a first embodiment will be described with reference to the drawings, FIG. 1 is a diagram showing a configuration of a communication system according to a first embodiment.

As shown in FIG. 1, the communication system includes a plurality of terminal units 10 (terminal unit 10A to terminal unit 10D), a plurality of MSC/VLR 20 (MSC/VLR 20A, MSC/VLR 20B), an HLR 30, and a GMSC/GGSN 40.

The terminal unit 10 is, for example, a mobile phone or fixed-line phone. The terminal unit 10 may be an apparatus that is compatible with VoIP.

The terminal units 10A to 10C are connected to a first network 100 via a base station (not shown) and the MSC/VLR 20. In the first embodiment, the terminal unit 10A exists in an area A which is managed by the MSC/VLR 20A. Meanwhile, the terminal units 10B, 10C exist in an area B which is managed by the MSC/VLR 20B.

The terminal unit 10D is connected to a second network 200 via a base station (not shown) and an MSC/VLR (not shown).

It should be noted that subscriber information of the terminal units 10A to 10C will be hereinafter referred to as subscriber information A to C.

The MSC/VLR 20 is configured to manage a terminal unit 10 that exists in an area which is managed by the MSC/VLR 20 itself. Specifically, the MSC/VLR 20 (Mobile Switching Center) functions as an exchanger configured to exchange transmission from the terminal unit 10 and reception at the terminal unit 10. In addition, the MSC/VLR 20 (Visitor Location Register) also functions as an apparatus configured to manage a location of the terminal unit 10 and the subscriber information of the terminal unit 10. Note that, the MSC/VLR 20 downloads the subscriber information from the HLR 30, in the case, for example, where the terminal unit 10 has entered the area managed by the MSC/VLR 20 itself.

The HLR (Home Location Register) is an apparatus configured to manage the location and the subscriber information of the terminal unit 10. Here, in the case where the area in which the terminal unit 10 exists is changed, the terminal unit 10 informs the HLR 30 of a new area in which the terminal unit 10 exists (location registration). The details of the HLR 30 will be described later (see FIG. 2).

It should be noted that the MSC/VLR 20 and the HLR 30 serve as a subscriber information storage device configured to store the subscriber information of the terminal unit 10 in the first embodiment.

The GMSC/GGSN 40 (Gateway MSC, Gateway GPRS Support Node) is configured to function as a gate way connected to the first network 100 and the second network 200.

(Configuration of the Subscriber Information Storage Device)

Figure 2:
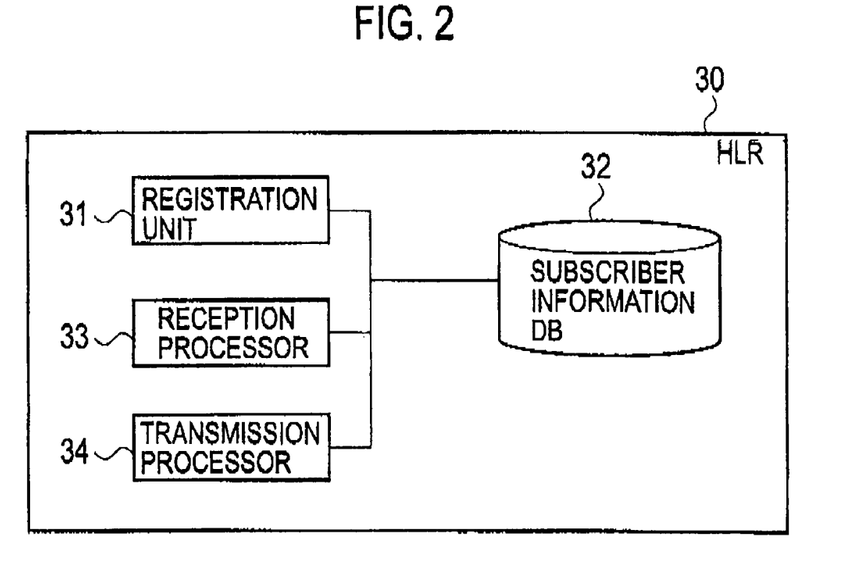
FIG. 2 is a block diagram showing a configuration of an HLR 30 according to the first embodiment.

Hereinafter, the configuration of the subscriber information storage device according to the first embodiment will be described with reference to the drawings. In the first embodiment, explanation will be given taking the HLR 30 as an example of the subscriber information storage device. FIG. 2 is a block diagram showing a configuration of the HLR 30 according to the first embodiment.

As shown in FIG. 2, the HLR 30 includes a registration unit 31, a subscriber information DB 32, a reception processor 33, and a transmission processor 34. It should be noted that only configurations that are necessary for explaining the first embodiment are shown in FIG. 2 and other configurations are omitted.

The registration unit 31 responds to a request (hereinafter, referred to as sub-user registration request) to register, as a sub user of one terminal unit 10 (e.g., terminal unit 10A), the other terminal unit 10 (e.g., terminal unit 10B), and then register the subscriber information of the other terminal unit 10 in the subscriber information DB 32, as the sub-user subscriber information (sub-registrant subscriber information) of the one terminal unit 10. Specifically, in the case where permission to the sub-user registration request is obtained by the other terminal unit 10, the registration unit 31 registers the subscriber information of the other terminal unit 10 in the subscriber information DB 32, as the sub-user subscriber information of the one terminal unit 10.

On the other hand, there is a case where the registration unit 31 registers the subscriber information of the other terminal unit 10 (e.g., terminal unit 10B) as the sub-user subscriber information of the one terminal unit 10 (e.g., terminal unit 10A). In this case, the registration unit 31 registers the subscriber information of the one terminal unit 10 in the subscriber information DB 32, as sub-user holder subscriber information (sub-registrant holder subscriber information) of the other terminal unit 10. Here, the sub-user holder i.e., sub-registrant holder indicates the main user viewed from the sub-user side.

Figure 3:
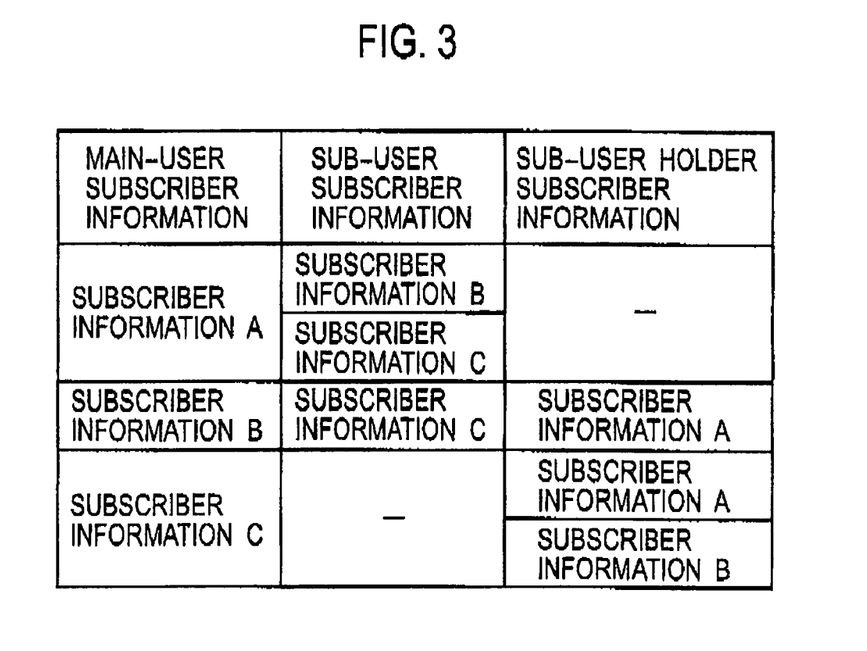
FIG. 3 is a diagram showing an example of information stored in a subscriber information DB 32 according to the first embodiment.

As shown in FIG. 3, the subscriber information DB 32 stores main-user subscriber information, sub-user subscriber information, and sub-user holder subscriber information, in such a manner that they are associated with each other. Here, a plurality of pieces of sub-user subscriber information (e.g., subscriber information B, C) may be registered for a single piece of main-user subscriber information (e.g., subscriber information A). In a similar way, a plurality of pieces of sub-user holder subscriber information (e.g., subscriber information A, B) may be registered for a single main-user subscriber information (e.g., subscriber information C). Alternatively, both the sub-user subscriber information (e.g., subscriber information C) and the sub-user holder subscriber information (e.g., subscriber information A) may be registered for a single piece of main-user subscriber information (e.g., subscriber information B).

Like common HLRs, the subscriber information DB 32 stores location information associated with the subscriber information (such as identification information of the area where the terminal unit exists, identification information of the base station and/or MSC/VLR that manage the area, or the like).

When transmission is made to a main user (e.g., terminal unit 10A), the reception processor 33 acquires the sub-user subscriber information associated with the main-user subscriber information (e.g., subscriber information A), by referring to the subscriber information DB 32. Subsequently, the reception processor 33 performs processing of reception at the sub users (e.g., terminal units 10B, 10C) with use of the sub-user subscriber information, Note that, in the first embodiment, the reception processor 33 performs processing of reception at both the main user and the sub users.

When transmission is made to the main user (e.g., terminal unit 10C), the reception processor 33 acquires the sub-user holder subscriber information associated with the main-user subscriber information (e.g., subscriber information C), by referring to the subscriber information DB 32. Subsequently, the reception processor 33 performs processing of reception at sub-user holders (e.g., terminal units 10A, 10B) with use of the sub-user holder subscriber information, Note that, in the first embodiment, the reception processor 33 performs processing of reception at both the main user and the sub-user holders.

When transmission is made to the main user (e.g., terminal unit 10B), the reception processor 33 acquires the sub-user subscriber information and the sub-user holder subscriber information associated with the main-user subscriber information (e.g., subscriber information B), by referring to the subscriber information DB 32. Subsequently, the reception processor 33 performs processing of reception at the sub-user and the sub-user holder (e.g., terminal units 10A, 10C) with use of the sub-user subscriber information and the sub-user holder subscriber information. Note that, in the first embodiment, the reception processor 38 performs processing of reception at all of the main user, the sub user and the sub-user holder.

Here, in the case where either one of the terminal units 10, i.e., that of the main user, that of the sub user, and that of the sub-user holder has responded, the reception processor 33 discontinues processing of reception at another certain terminal unit 10. Subsequently, the reception processor 33 sends to the certain terminal unit 10 the identification information (e.g., telephone number) of the terminal unit 10 which has undergone reception processing.

When transmission is made from the main user (e.g., terminal unit 10A), the transmission processor 34 acquires the sub-user subscriber information associated with the main-user subscriber information (e.g., subscriber information A), by referring to the subscriber information DB 32. Subsequently, the transmission processor 34 performs processing of transmission from the sub user (e.g., terminal unite 10B) with use of the sub-user subscriber information.

When transmission is made from the main user (e.g., terminal unit 10B), the transmission processor 34 acquires the sub-user holder subscriber information associated with the main-user subscriber information (e.g., subscriber information B), by referring to the subscriber information DB 32. Subsequently, the transmission processor 34 performs processing of transmission from the sub-user holder (e.g., terminal unite 10A) with use of the sub-user holder subscriber information.

(Operation of the Communication System)

Hereinafter, operation of the communication system according to the first embodiment will be described with reference to the drawings. FIGS. 4 to 8 are sequence diagrams showing the operation of the communication system according to the first embodiment.

(1) Registration Processing of the Sub User and Sub-User Holder

Figure 4:
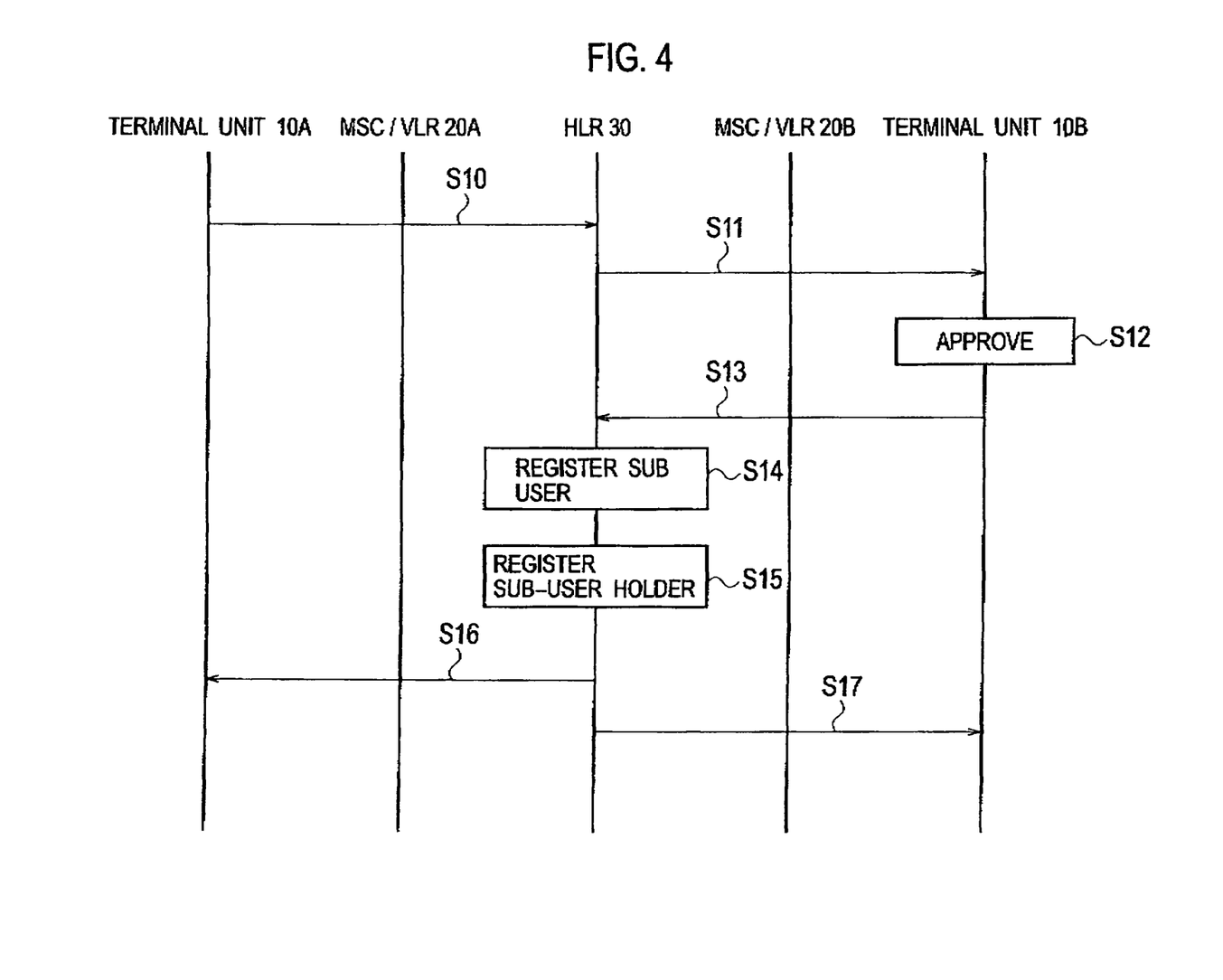
FIG. 4 is a sequence diagram showing an operation of the communication system according to the first embodiment.

The registration processing of the sub user and sub-user holder will be explained with reference to FIG. 4. In FIG. 4, explanation will be given on the case where the terminal unit 10A registration units the terminal unit 10B as the sub user.

As shown in FIG. 4, in step 10, the terminal unit 10A sends, via the MSC/VLR 20A to the HLR 30, a sub-user registration request which requests that the terminal unit 10B be registered as the sub user.

In step 11, the HLR 30 sends, via the MSC/VLR 20B to the terminal unit 10B, an approval request which requests an approval to the request that the terminal unit 10B be registered as the sub user of the terminal unit 10A.

In step 12, the terminal unit 10B approves that it be registered as the sub user of the terminal unit 10A.

In step 13, the terminal unit 10B sends, via the MSC/VLR 20B to the HLR 30, an approval response which approves that it be registered as the sub user of the terminal unit 10A.

In step 14, the HLR 30 registers the terminal unit 10B as the sub user of the terminal unit 10A. Specifically, the HLR 30 registers the subscriber information B in the subscriber information DB 32 as the sub-user subscriber information, in a manner that the subscriber information B is associated with the subscriber information A which has already been registered as the main-user subscriber information.

In step 15, the HLR 30 registers the terminal unit 10A as the sub-user holder of the terminal unit 10B. Specifically, the HLR 30 registers the subscriber information A in the subscriber information DB 32 as the sub-user holder subscriber information, in a manner that the subscriber information A is associated with the subscriber information B which has already been registered as the main-user subscriber information.

In step 16, the HLR 30 sends, via the MSC/VLR 20A to the terminal unit 10A, a sub-user registration response indicating that the terminal unit B has been registered as the sub user.

In step 17, the HLR 30 sends, via the MSC/VLR 20B to the terminal unit 10B, a sub-user holder registration response indicating that the terminal unit A has been registered as the sub-user holder.

(2) Transmission Processing with Use of the Sub-User Subscriber Information

Figure 5:
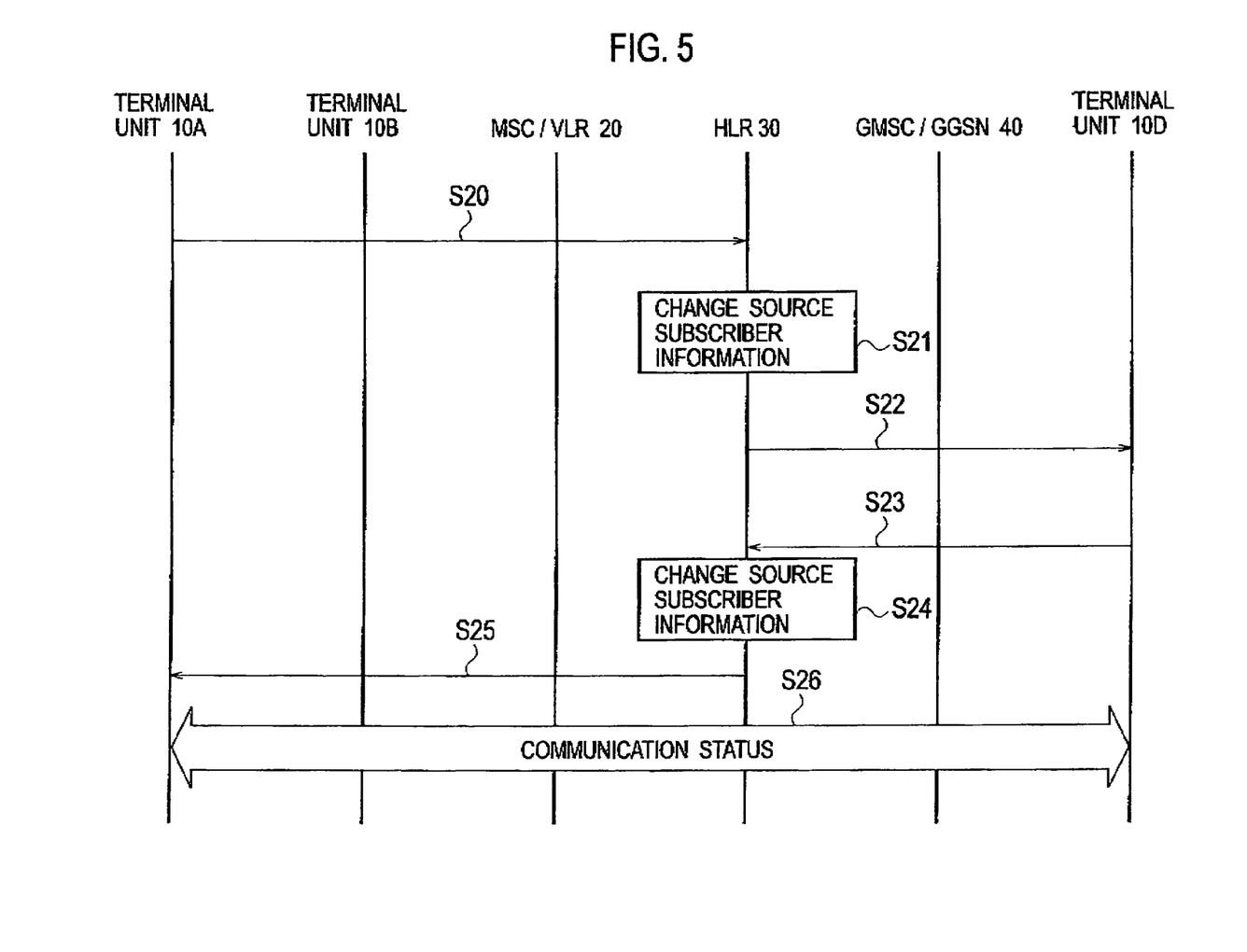
FIG. 5 is a sequence diagram showing an operation of the communication system according to the first embodiment.

The transmission processing with use of the sub-user subscriber information will be explained with reference to FIG. 5. In FIG. 5, explanation will be given on the case where the terminal unit 10A requests transmission with use of the subscriber information B (sub-user subscriber information). Please assume that the terminal unit 10B has already been registered as the sub user of the terminal unit 10A.

As shown in FIG. 5, in step 20, the terminal unit 10A sends, via the MSC/VLR 20 to the HLR 30, a transmission request to transmit a call to the terminal unit 10D with use of the subscriber information B (sub-user subscriber information) of the terminal unit 10B.

In step 21, the HLR 30 determines whether or not the subscriber information B corresponds, as the sub-user subscriber information, to the subscriber information A registered as the main-user subscriber information, by referring to the subscriber information DB 32. If the subscriber information B is associated with the subscriber information A, the HLR 30 changes source subscriber information from the subscriber information A to the subscriber information B.

Note that, the HLR 30 stores, in the subscriber information DB 32, the information that a simulation call has been transmitted from the terminal unit 10B in response to the transmission from the terminal unit 10A.

In step 22, the HLR 30 sends, via the GMSC/GGSN 40 to the terminal unit 10D, a calling signal for calling up the terminal unit 10D, with use of the subscriber information B as the source subscriber information.

In step 23, the terminal unit 10D sends, via the GMSC/GGSN 40 to the HLR 30, a calling response signal which is a response to the calling signal.

In step 24, the HLR 30 changes the source subscriber information from the subscriber information B to the subscriber information A, by referring to the subscriber information DB 32.

In step 25, the HLR 30 sends, via the MSC/VLR 20 to the terminal unit 10A, a transmission response indicating that the terminal unit 10D) has responded to the transmission request.

In step 26, communication is started between the terminal unit 10A and the terminal unit 10D.

Figure 6:
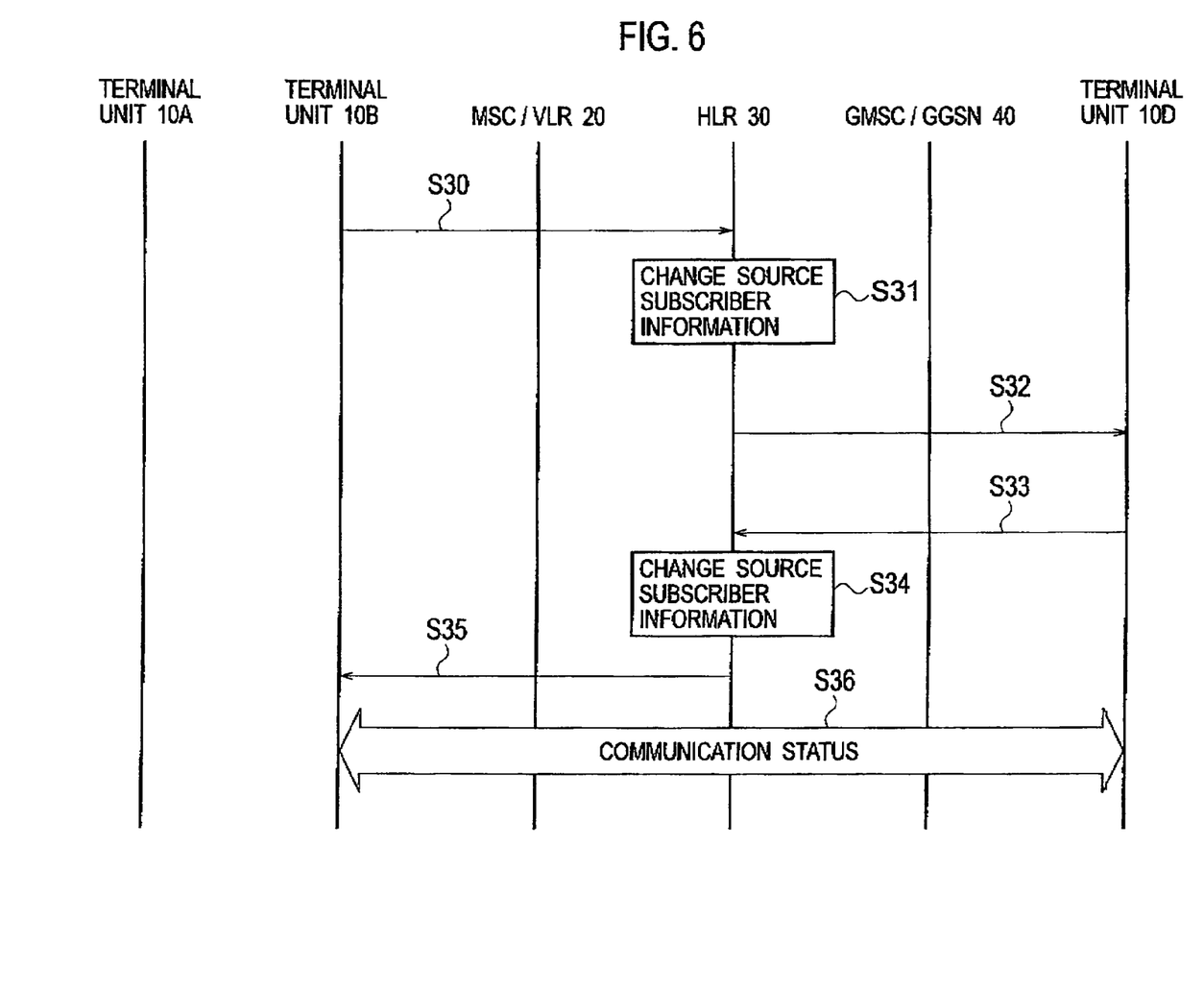
FIG. 6 is a sequence diagram showing an operation of the communication system according to the first embodiment.

(3) Transmission Processing with Use of the Sub-User Holder Subscriber Information The transmission processing with use of the sub-user holder subscriber information will be explained with reference to FIG. 6. In FIG. 6, explanation will be given on the case where the terminal unit 10B requests transmission with use of the subscriber information A (sub-user holder subscriber information). Please assume that the terminal unit 10A has already been registered as the sub-user holder of the terminal unit 10.

As shown in FIG. 6, in step 30, the terminal unit 10B sends, via the MSC/VLR 20 to the HLR 30, a transmission request to transmit a call to the terminal unit 10D with use of the subscriber information A (sub-user holder subscriber information) of the terminal unit 10A.

In step 31, the HLR 30 determines whether or not the subscriber information A corresponds, as the sub-user holder subscriber information, to the subscriber information B registered as the main-user subscriber information, by referring to the subscriber information DB 32. If the subscriber information A is associated with the subscriber information B, the HLR 30 changes the source subscriber information from the subscriber information B to the subscriber information A.

Note that, the HLR 30 stores, in the subscriber information DB 32, the information that a simulation call has been transmitted from the terminal unit 10A in response to the transmission from the terminal unit 10B.

In step 32, the HLR 30 sends, via the GMSC/GGSN 40 to the terminal unit 10D, a calling signal for calling up the terminal unit 10D, with use of the subscriber information A as the source subscriber information.

In step 33, the terminal unit 10D sends, via the GMSC/GGSN 40 to the HLR 30, a calling response signal which is a response to the calling signal.

In step 34, the HLR 30 changes the source subscriber information from the subscriber information A to the subscriber information B, by referring to the subscriber information DB 32.

In step 35, the HLR 30 sends, via the MSC/VLR 20 to the terminal unit 10B, a transmission response indicating that the terminal unit 10D has responded to the transmission request.

In step 36, communication is started between the terminal unit 10B and the terminal unit 10D.

(4) Processing of Reception at the Sub User

Figure 7:
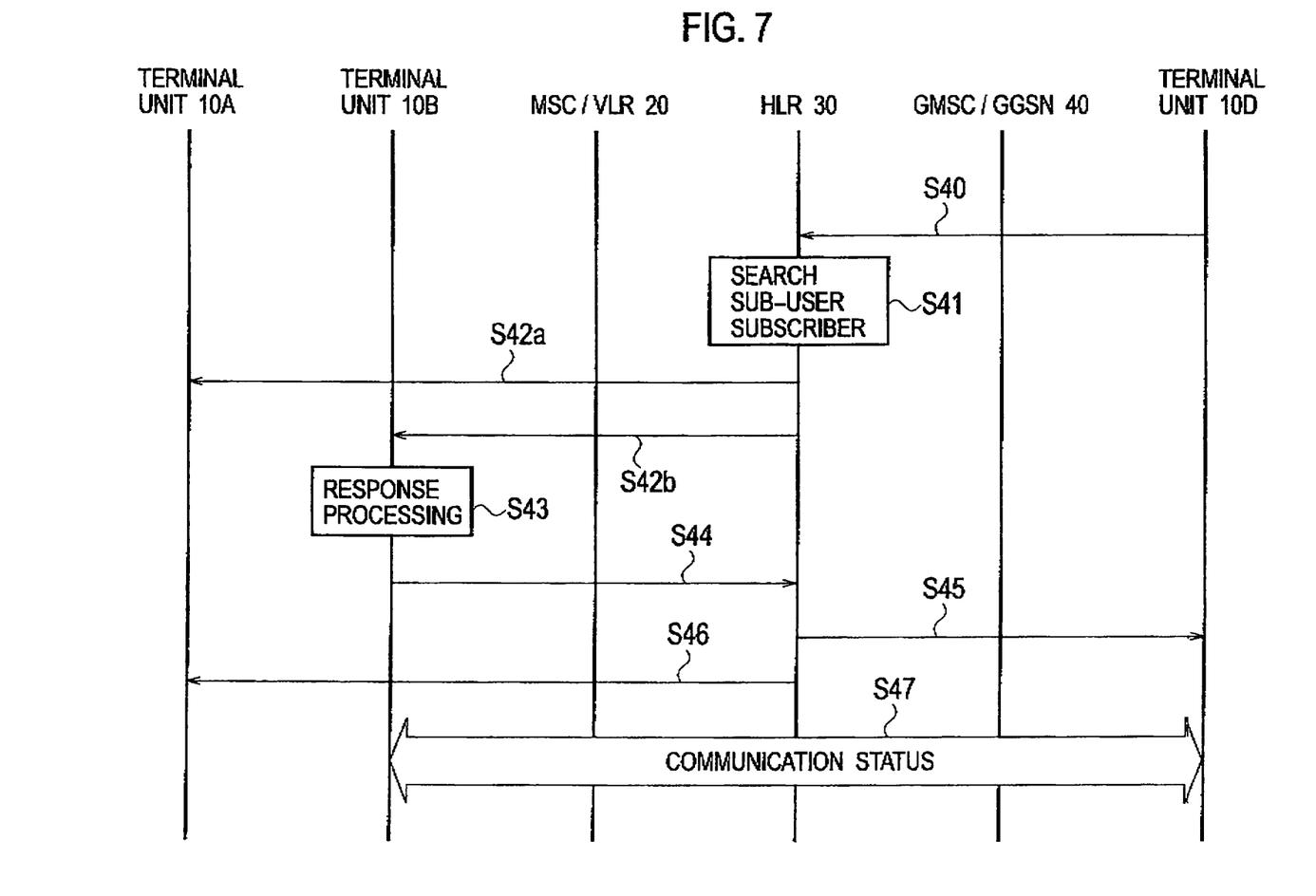
FIG. 7 is a sequence diagram showing an operation of the communication system according to the first embodiment.

The processing of reception at the sub user will be explained with reference to FIG. 7. In FIG. 7, explanation will be given on the case where the terminal unit 10D performs transmission to the terminal unit 10A. Please assume that the terminal unit 10B has already been registered as the sub user of the terminal unit 10A.

As shown in FIG. 7, in step 40, the terminal unit 10D sends, via the GMSC/GGSN 40 to the HLR 30, a transmission request to transmit a call to the terminal unit 10A.

In step 41, the HLR 30 searches the subscriber information DB 32 for the subscriber information registered as the sub-user subscriber information in association with the subscriber information A registered as the main-user subscriber information.

In steps 42a and 42b, the HLR 30 sends, via the MSC/VLR 20 to the terminal units 10A and 10B, a calling signal for calling up the main user and the sub user.

In step 43, the terminal unit 10B (sub user) responds to the calling signal.

In step 44, the terminal unit 10B sends, via the MSC/VLR 20 to the HLR 30, a calling response signal which is a response to the calling signal.

In step 45, the HLR 30 changes destination subscriber information from the subscriber information B to the subscriber information A, and subsequently sends, via the GMSC/GGSN 40 to the terminal unit 10D, a transmission response indicating that the terminal unit 10A has responded to the transmission request.

In step 46, the HLR 30 discontinues calling up of the terminal unit 10A, and notifies the terminal unit 10A of the identification information (e.g., telephone number) of the terminal unit 10B which has undergone reception processing.

In step 47, communication is started between the terminal unit 10B and the terminal unit 10D.

(5) Processing of Reception at the Sub-User Holder

Figure 8:
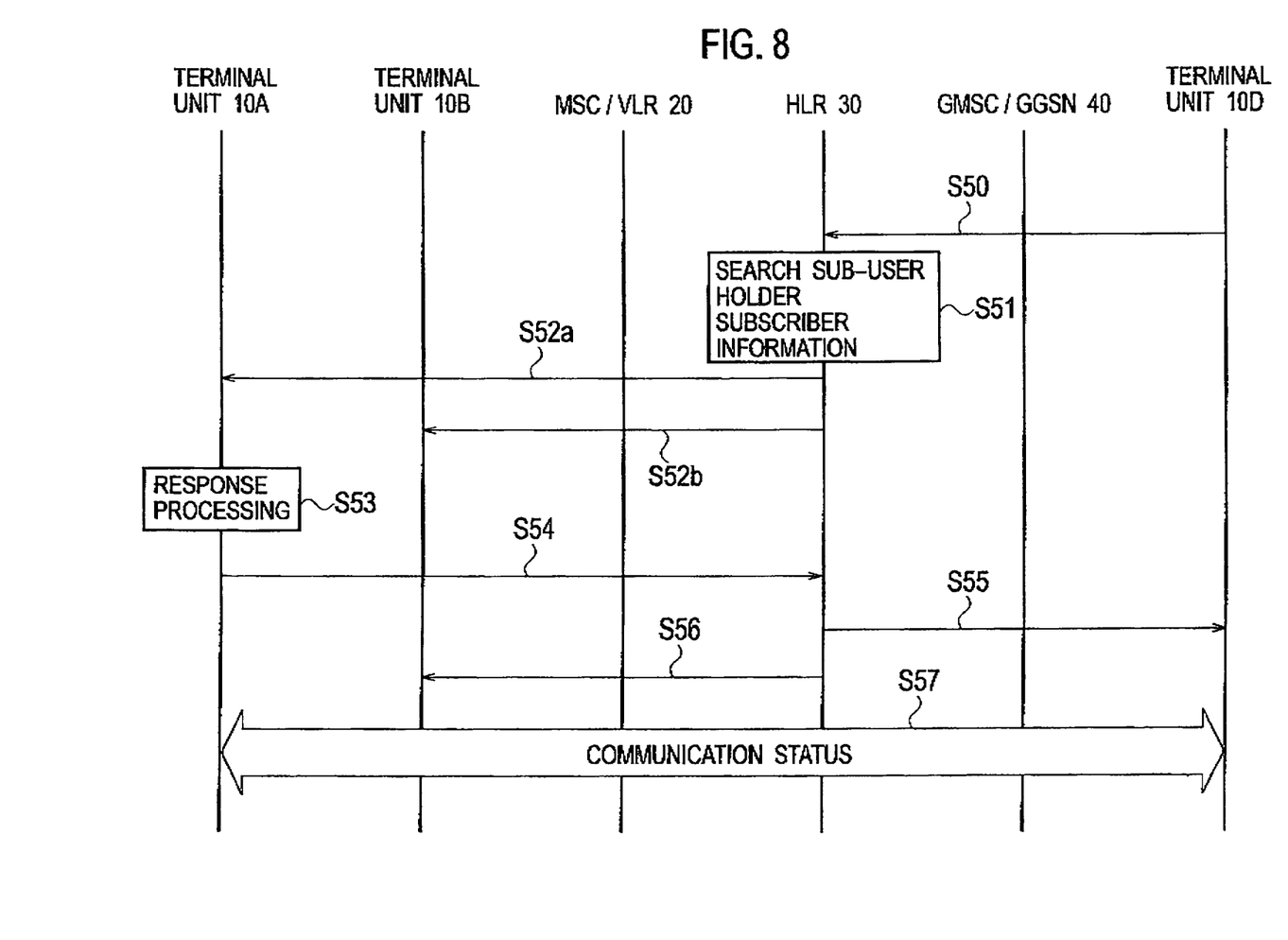
FIG. 8 is a sequence diagram showing an operation of the communication system according to the first embodiment.

The processing of reception at the sub-user holder will be explained with reference to FIG. 8. In FIG. 8, explanation will be given on the case where the terminal unit 10D performs transmission to the terminal unit 10B, Please assume that the terminal unit 10A has already been registered as the sub-user holder of the terminal unit 10B.

As shown in FIG. 8, in step 50, the terminal unit 10D sends, via the GMSC/GGSN 40 to the HLR 30, a transmission request to transmit a call to the terminal unit 10B.

In step 51, the HLR 30 searches the subscriber information DB 82 for the subscriber information registered as the sub-user holder subscriber information in association with the subscriber information B registered as the main-user subscriber information.

In steps 52a and 52b, the HLR 30 sends, via the MSC/VLR 20 to the terminal units 10A and 10B, a calling signal for calling up the main user and the sub user.

In step 53, the terminal unit 10A (sub-user holder) responds to the calling signal.

In step 54, the terminal unit 10A sends, via the MSC/VLR 20 to the HLR 30, a calling response signal which is a response to the calling signal.

In step 55, the HLR 30 changes the destination subscriber information from the subscriber information A to the subscriber information B, and subsequently sends, via the GMSC/GGSN 40 to the terminal unit 10D, a transmission response indicating that the terminal unit 10B has responded to the transmission request.

In step 56, the HLR 30 discontinues calling up of the terminal unit 10B, and notifies the terminal unit 10B of the identification information (e.g., telephone number) of the terminal unit 10A which has undergone reception processing.

In step 57, communication is started between the terminal unit 10A and the terminal unit 10D.

EFFECTS AND ADVANTAGES

According to the first embodiment, the sub-user subscriber information and the sub-user holder subscriber information, in addition to the main-user subscriber information, is registered in the subscriber information DB 32. When transmission is made to the main user, processing of reception at the sub user and the sub-user holder is performed with use of the sub-user subscriber information and the sub-user holder subscriber information.

As described above, the subscriber information used in transmission does not need to coincide with the subscriber information to be used in reception. As a result, compared to a conventional technique where the subscriber information is switched at the terminal unit, the degree of freedom in selecting the subscriber information used in transmission or reception is increased, and thus convenience of a user is enhanced.

According to the first embodiment, in the case where either one of the terminal units 10, i.e., that of the main user, that of the sub user, and that of the sub-user holder, has responded to the transmission, the reception processor 33 discontinues processing of reception at the other terminal units 10. Subsequently, the reception processor 33 sends to the other terminal units 10 the identification information (e.g., telephone number) of the terminal unit 10 which has undergone reception processing.

Therefore, the other terminal units 10 (other users) which have not undergone reception processing can learn which terminal unit 10 (or which user) has undergone reception processing.

[Second Embodiment]

Hereinafter, a second embodiment will be described with reference to the drawing. Explanation will be mainly given on the difference between the first embodiment as described above and the second embodiment.

Although not particularly mentioned in the above-described first embodiment, specifically in the second embodiment, it is possible to restrict transmission and reception with use of the sub-user subscriber information and the sub-user holder subscriber information.

(Configuration of the Subscriber Information Storage Device)

Figure 9:
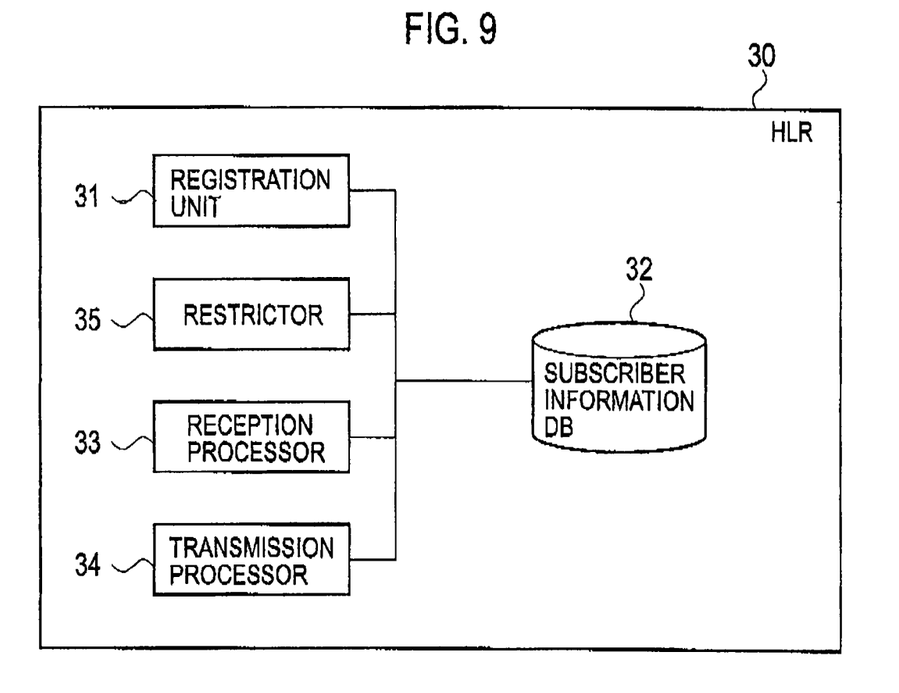
FIG. 9 is a block diagram showing a configuration of an HLR 30 according to a second embodiment.

Hereinafter, a configuration of the subscriber information storage device according to the second embodiment will be described with reference to the drawing. In the second embodiment, explanation will be given taking the HLR 30 as an example of the subscriber information storage device. FIG. 9 is a block diagram showing a configuration of the HLR 30 according to the second embodiment.

As shown in FIG. 9, the HLR 30 includes a registration unit 35, in addition to the configurations shown in FIG. 2. It should be noted that, in FIG. 9, similar numerals and characters are provided to configurations that are similar to those in FIG. 2.

Figure 10:
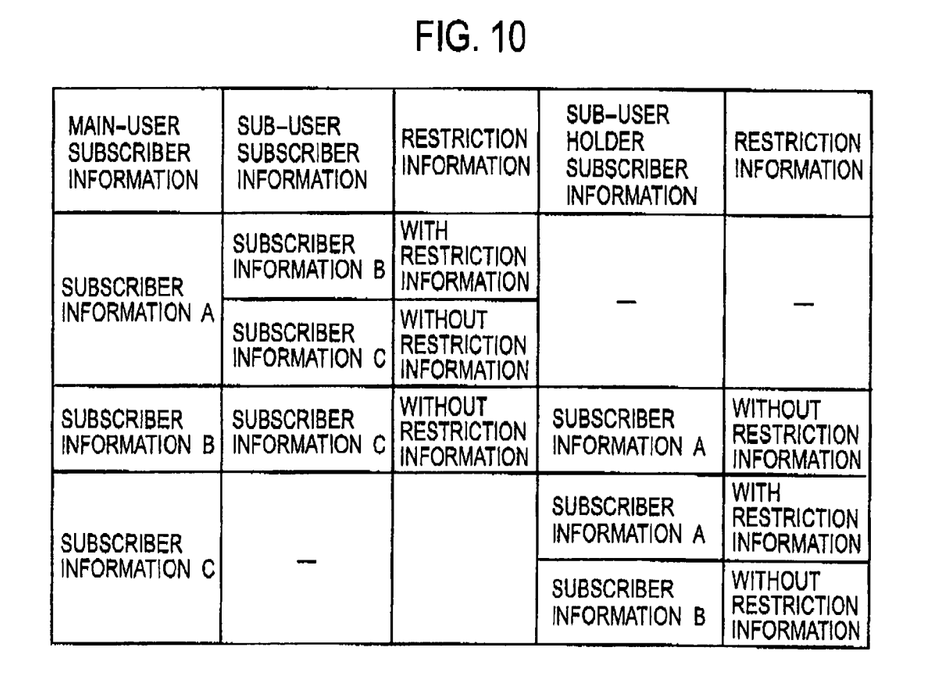
FIG. 10 is a diagram showing an example of information stored in a subscriber information DB 32 according to the second embodiment.

As shown in FIG. 10, the subscriber information DB 32 stores the restriction information, in addition to the main-user subscriber information, the sub-user subscriber information, and the sub-user holder subscriber information. The restriction information is associated with the sub-user subscriber information and the sub-user holder subscriber information.

The restriction information is the information for restricting transmission and reception with use of the sub-user subscriber information and the sub-user holder subscriber information. Specifically, the restriction information is thought to include the following information.

(1) Restriction on transmission with use of the sub-user subscriber information
(2) Restriction on reception with use of the sub-user subscriber information
(3) Restriction on transmission and reception with use of the sub-user subscriber information
(4) Restriction on transmission with use of the sub-user holder subscriber information
(5) Restriction on reception with use of the sub-user holder subscriber information
(6) Restriction on Transmission and Reception with Use of the Sub-User Holder Subscriber Information In the case of restriction on reception with use of the sub-user subscriber information or the sub-user holder subscriber information, whether or not to make restriction may be set in accordance with the terminal of the transmitter. Such setting may be made freely by the main user.

In the case where transmission from the main user or reception at the main user is made, the restrictor 35 is configured to determine whether or not the main-user subscriber information is associated with the restriction information, by referring to the subscriber information DB 32. If the main-user subscriber information is associated with the restriction information, the restrictor 35 is configured to restrict transmission and reception with use of the sub-user subscriber information or the sub-user holder subscriber information, in accordance with the restriction information.

EFFECTS AND ADVANTAGES

According to the second embodiment, it is possible to restrict transmission and reception with use of the sub-user subscriber information or the sub-user holder subscriber information. Therefore, convenience of the user is enhanced.

[Third Embodiment]

Hereinafter, a third embodiment will be described with reference to the drawing. Explanation will be mainly given on the difference between the first embodiment as described above and the third embodiment.

Although not particularly mentioned in the above-described first embodiment, specifically in the third embodiment, an additional service which is set to either one of the main user, the sub user, and the sub-user holder is shared by the main user, the sub user, and the sub-user holder.

(Configuration of the Subscriber Information Storage Device)

Figure 11:
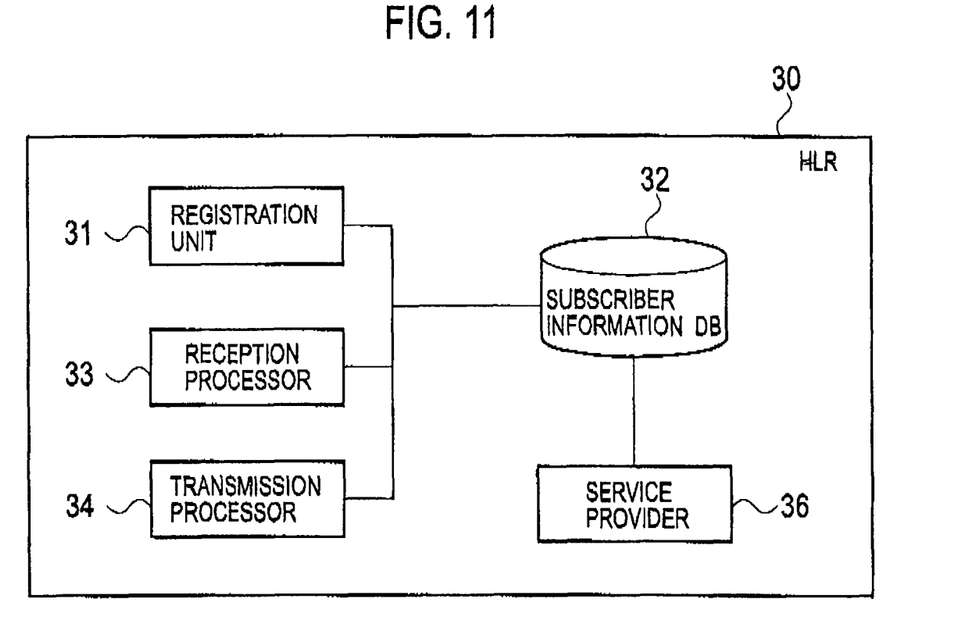
FIG. 11 is a block diagram showing a configuration of an HLR 30 according to a third embodiment.

Hereinafter, a configuration of the subscriber information storage device according to the third embodiment will be described with reference to the drawing. In the third embodiment, explanation will be given taking the HLR 30 as an example of the subscriber information storage device. FIG. 11 is a block diagram showing a configuration of the HLR 30 according to the third embodiment.

As shown in FIG. 11, the HLR 30 includes a service provider 36, in addition to the configurations shown in FIG. 2. It should be noted that, in FIG. 11, similar numerals and characters are provided to configurations that are similar to those in FIG. 2.

In the case where reception at the main user is made, the service provider 36 is configured to determine whether or not an additional service is set to either one of the main user, the sub user and the sub-user holder. In the case where an additional service has been set, even if either one of the main user, the sub user and the sub-user holder performs reception processing, the service provider 36 provides the additional service to the terminal unit 10 which has performed reception processing.

Note that the service provider 36 does not need to have a function of providing an additional service. In this case, the service provider 36 may instruct a server for providing an additional service to the terminal unit 10 to provide the additional service thereto.

Here, the additional service refers to a service which is used at reception. For example, it includes forwarding service, answering phone service, call-waiting service and the like.

EFFECTS AND ADVANTAGES

According to the third embodiment, an additional service which is set to either one of the main user, the sub user and the sub-user holder is shared by the main user, the sub user and the sub-user holder. Accordingly, convenience of the user is enhanced.

[Fourth Embodiment]

Hereinafter, a fourth embodiment will be described with reference to the drawing. Explanation will be mainly given on the difference between the first embodiment as described above and the fourth embodiment.

Although not particularly mentioned in the above-described first embodiment, specifically in the fourth embodiment, in the case where the sub user or the sub-user holder performs reception processing, the terminal unit 10 which has performed reception processing is informed of the identification information (e.g., telephone number) of the main user. In addition, the terminal units 10 which have not performed reception processing are informed of the communication status of the terminal unit 10, among the main user, the sub user and the sub-user holder, which has performed reception processing.

(Configuration of the Subscriber Information Storage Device)

Figure 12:
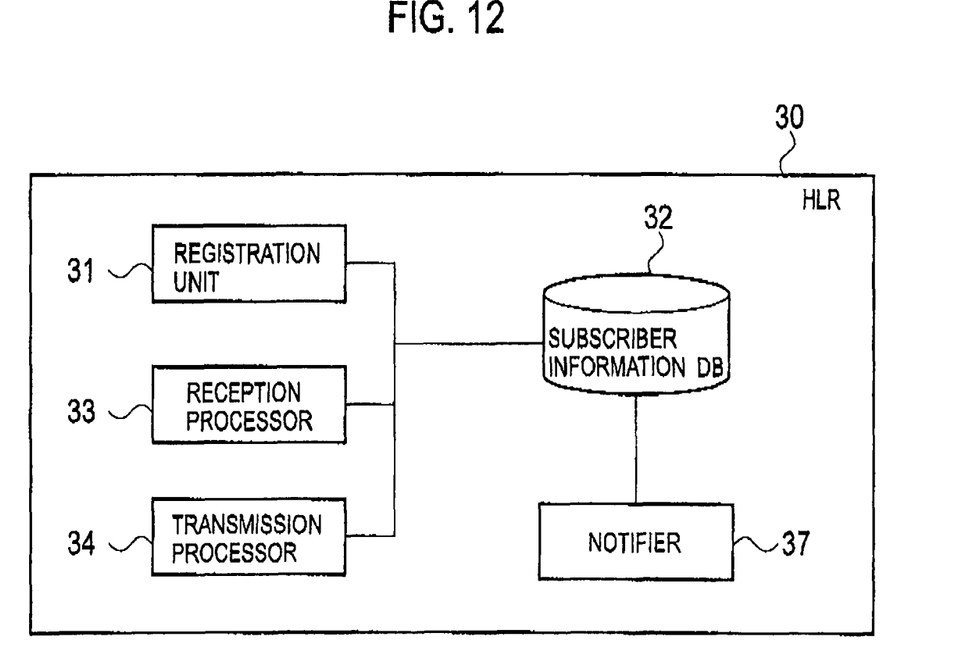
FIG. 12 is a block diagram showing a configuration of an HLR 30 according to a fourth embodiment.

Hereinafter, a configuration of the subscriber information storage device according to the fourth embodiment will be described with reference to the drawing. In the fourth embodiment, explanation will be given taking the HLR 30 as an example of the subscriber information storage device. FIG. 12 is a block diagram showing a configuration of the HLR 30 according to the fourth embodiment.

As shown in FIG. 12, the HLR 30 includes a notifier 37, in addition to the configurations shown in FIG. 2. It should be noted that, in FIG. 12, similar numerals and characters are provided to configurations that are similar to those in FIG. 2.

In the case where the sub user or the sub-user holder has performed reception processing when transmission is made to the main user, the notifier 37 is configured to notify the terminal unit 10 which has performed reception processing of the identification information (e.g., telephone number) of the main user.

The notifier 37 is configured to notify the terminal units 10 which have not performed reception processing of the communication status of the terminal unit 10, among the main user, the sub user and the sub-user holder, which has performed reception processing.

Here, the communication status refers to start of communication, termination of communication, duration time of communication, and the like. Notification of the communication status is made when communication is started, when it is terminated, or periodically.

EFFECTS AND ADVANTAGES

According to the fourth embodiment, in the case where the sub user or the sub-user holder has performed reception processing when transmission is made to the main user, the notifier 37 notifies the terminal unit 10 which has performed reception processing of the identification information (e.g., telephone number) of the main user. Therefore, the sub user or the sub-user holder who has performed reception processing can learn who was supposed to perform reception processing originally.

According to the fourth embodiment, the notifier 37 notifies the terminal units 10 which have not performed reception processing, of the communication status of the terminal unit 10, among the main user, the sub user and the sub use, which has performed reception processing. Therefore, the users who have not performed reception processing can learn the status of the communication that is related to themselves.

[Fifth Embodiment]

Hereinafter, a fifth embodiment will be described with reference to the drawing. Explanation will be mainly given on the difference between the first embodiment as described above and the fifth embodiment.

Although not particularly mentioned in the above-described first embodiment, specifically in the fifth embodiment, communication performed by either one of the terminal units 10 i.e., that of the main user, that of the sub user, and that of the sub-user holder is transferred to the other terminal units 10.

(Configuration of the Subscriber Information Storage Device)

Hereinafter, a configuration of the subscriber information storage device according to the fifth embodiment will be described with reference to the drawing. In the fifth embodiment, explanation will be given taking the HLR 30 as an example of the subscriber information storage device, FIG. 13 is a block diagram showing a configuration of the HLR 30 according to the fifth embodiment.

Figure 13:
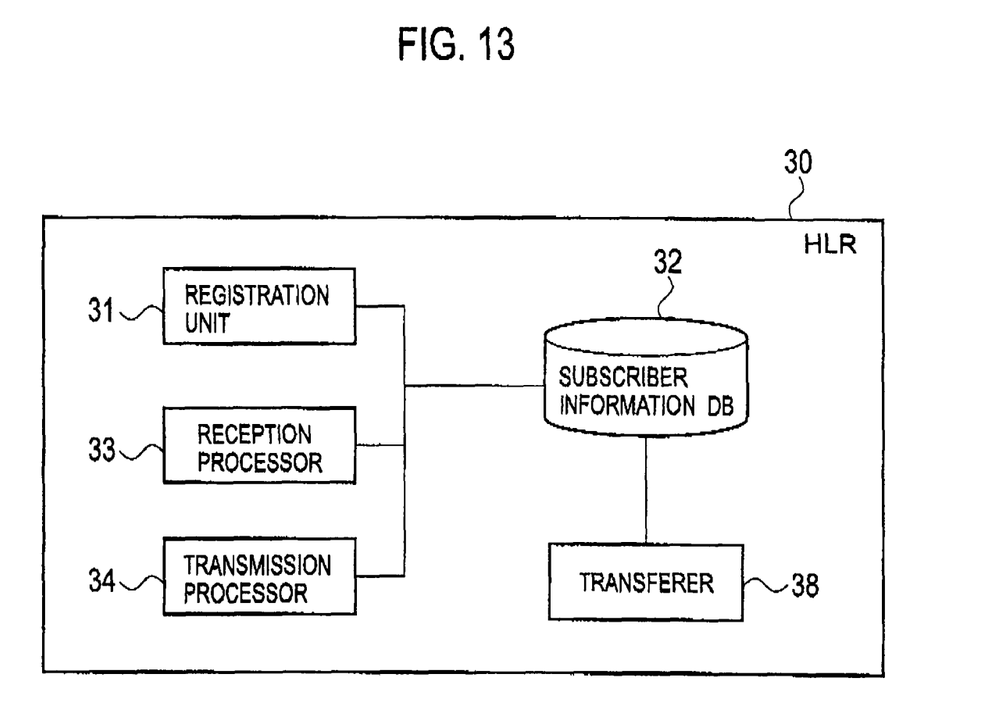
FIG. 13 is a block diagram showing a configuration of an HLR 30 according to a fifth embodiment.

As shown in FIG. 13, the HLR 30 includes a transferer 38, in addition to the configurations shown in FIG. 2. It should be noted that, in FIG. 13, similar numerals and characters are provided to configurations that are similar to those in FIG. 2.

The transferer 38 is configured to transfer communication performed by either one of the terminal units 10, i.e., that of the main user, that of the sub user, and that of the sub-user holder, to the other terminal units 10. Here, communication may be transferred either at the start of or during communication.

Note that the transferer 38 does not need to have a function of transferring communication. In such cases, the transferer 38 may instruct a server for managing communication to transfer the communication.

EFFECTS AND ADVANTAGES

According to the fifth embodiment, the transferer 38 transfers communication performed by either one of the terminal units 10, i.e., that of the main user, that of the sub user, and that of the sub-user holder, to the other terminal units 10. Accordingly, a group call can be performed with use of the sub-user subscriber information and the sub-user holder subscriber information.

[Other Embodiments]

The present invention has been explained with use of the above-described embodiments. However, the descriptions and drawings that constitute a part of the disclosure should not be construed as the limitation of the present invention. Various alternative embodiments, examples and applied technologies will be apparent to those skilled in the art from the disclosure.

For example, although not particularly mentioned in the embodiments as described above, the main user, the sub user and the sub-user holder may be the same user. Alternatively, the main user, the sub user and the sub-user holder may be different users. In the latter case, it is possible to use the sub-user subscriber information and the sub-user holder subscriber information in a group call which is performed by a plurality of terminal units 10 (users), by registering the sub-user and the subscriber sub-user in the HLR 30.

Although not particularly mentioned in the embodiments as described above, transmission and reception may be those with use of circuit-switched communication, or those with use of the packet-switched communication.

In the embodiments as described above, the registration unit 31, the subscriber information db 32, the reception processor 33, the transmission processor 34, the restrictor 35, the service provider 36, the notifier 37, and the transferer 38 are provided in the HLR 30. However, the configuration is not limited to this. The registration unit 31, the subscriber information db 32, the reception processor 33, the transmission processor 34, the restrictor 35, the service provider 36, the notifier 37, and the transferer 38 may be arranged in a distributed manner in various apparatuses (servers) included in the first network 100.

In the embodiments as described above, explanation will be given taking the HLR 30 as an example of the subscriber information storage device. However, the invention is not limited to this. The MSC/VLR 20 may serve as the subscriber information storage device.

What is claimed is:

1. A communication system comprising:
a subscriber information storage device configured to store a plurality of subscriber information;
a registration unit configured to register, in addition to a first subscriber information,
a second subscriber information in the subscriber information storage device, as sub-registrant subscriber information of a first terminal unit, the first subscriber information being the subscriber information associated with the first terminal unit, and the second subscriber information being the subscriber information associated with a second terminal unit, wherein the registration unit registers, in addition to the second subscriber information, the first subscriber information in the subscriber information storage device, as sub-registrant holder subscriber information of the second terminal unit,
a reception processor configured to acquire the sub-registrant subscriber information associated with the first subscriber information by referring to the subscriber information storage device, when transmission is made to the first terminal unit, and subsequently to perform processing of reception at the second terminal unit with use of the sub-registrant subscriber information, the reception processor acquires the sub-registrant holder subscriber information associated with the second subscriber information by referring to the subscriber information storage device, when transmission is made to the second terminal unit, and subsequently performs processing of reception at the first terminal unit with use of the sub-registrant holder subscriber information; and
a transmission processor configured to acquire the sub-registrant subscriber information associated with the first subscriber information by referring to the subscriber information storage device, when transmission is made from the first terminal unit, and subsequently perform processing of transmission from the second terminal unit with use of the sub-registrant subscriber information.

2. The communication system according to claim 1, wherein the transmission processor acquires the sub-registrant holder subscriber information associated with the second subscriber information by referring to the subscriber information storage device when transmission is made from the second terminal unit, and subsequently performs processing of transmission from the first terminal unit with use of the sub-registrant holder subscriber information.

3. The communication system according to claim 1, further comprising:
   a transferer configured to transfer communication performed by one of the first terminal unit and the second terminal unit to the other terminal unit.

4. The communication system according to claim 1, further comprising:
   a restrictor configured to restrict any one of reception processing with use of the sub-registrant subscriber information and transmission processing with use of the sub-registrant subscriber information.

5. The communication system according to claim 1, further comprising:
   a restrictor configured to restrict one of reception processing with use of the sub-registrant holder subscriber information and transmission processing with use of sub-registrant holder subscriber information.

6. The communication system according to claim 1, wherein
   in the case where any one of the first terminal unit and the second terminal unit has responded, the reception processor discontinues processing of reception at the other terminal unit, and sends to the other terminal unit the identification information of the terminal unit which has responded.

7. The communication system according to claim 1, further comprising a service provider configured to provide an additional service, which is to be used at reception, to both of the first terminal unit and the second terminal unit when any one of the first terminal unit and the second terminal unit is set to be provided with the additional service.

8. The communication system according to claim 1, further comprising a notifier configured to notify identification information of the other terminal unit to which the transmission is made, to one of the first terminal unit and the second terminal unit which responds to operation of the reception processor when transmission is made to the other terminal unit.

9. The communication system according to claim 1, further comprising a notifier configured to notify a communication status of the other terminal unit, to one of the first terminal unit and the second terminal unit.

\* \* \* \* \*